March 24, 1964 R. J. HARTMEISTER 3,125,810
TEST INDICATOR
Filed Feb. 7, 1961 3 Sheets-Sheet 1
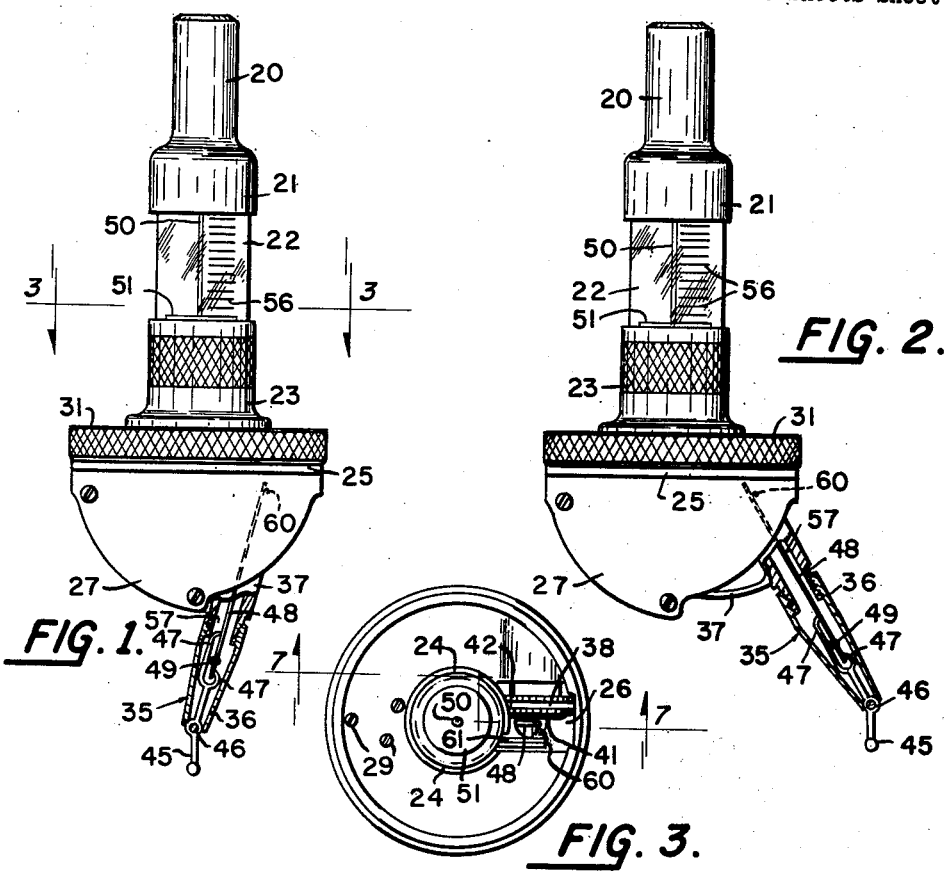
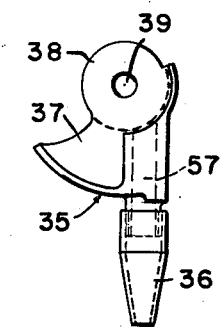
FIG. 4.
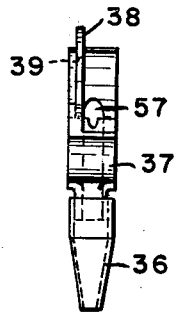
FIG. 5.
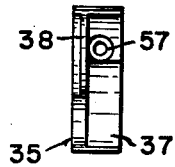
FIG. 6.
INVENTOR.
RUBEN J. HARTMEISTER
BY Bertha L. MacGregor
ATTORNEY March 24, 1964     R. J. HARTMEISTER     3,125,810
TEST INDICATOR Filed Feb. 7, 1961     3 Sheets-Sheet 2

INVENTOR.
RUBEN J. HARTMEISTER
BY Bertha L. MacGregor
ATTORNEY

March 24, 1964 R. J. HARTMEISTER 3,125,810
TEST INDICATOR

Filed Feb. 7, 1961 3 Sheets-Sheet 3

INVENTOR.
RUBEN J. HARTMEISTER

BY Bertha L. MacGregor
ATTORNEY

United States Patent Office 3,125,810
Patented Mar. 24, 1964

3,125,810
TEST INDICATOR
Ruben J. Hartmeister, 1034 6th St., Golden, Colo.
Filed Feb. 7, 1961, Ser. No. 98,731
8 Claims. (Cl. 33—172)

This invention relates to precision instruments known as test indicators designed for use in centering work relatively to a machine tool, for aligning a tool mounted in a tool chuck or other rotatable support with a point on a work piece, and for determining inaccuracies in work surfaces carried by machines such as lathes and the like.

Test indicators of the character described comprise essentially a shank adapted to be fitted into and rotated by a tool chuck or other support, a transparent tubular scale in which an indicator disc is movably mounted, a housing, a swivel arm pivotally mounted in the housing and protruding therefrom, a work contacting pointer pivotally mounted in the free end of the swivel arm, and means operatively connecting the pointer and indicator disc, whereby minute movements of the pointer imparted by contact with the work surfaces are transmitted in greatly multiplied degree to the indicator disc.

Test indicators heretofore known have been provided with swivel arm adjustment means for adjusting the swivel arm position relatively to the indicator housing by manipulation of fastening screws or bolts which required the adjustment to be made while the indicator was inoperative. One of the objects of my invention is to provide means whereby the swivel arm assembly of my test indicator can be adjusted relatively to the work and to the indicator housing at the will of the operator during the rotation of the device and without manipulation of screws or bolts. The swivel arm assembly of my indicator can be moved over a predetermined diameter while the device as a whole is mounted in a tool chuck or other rotated support and is being rotated thereby. This improvement results in a substantial saving of time and in greater accuracy in adjustment and operation of the indicator for its intended purposes.

The swivel arm assembly of my invention can be adjusted during the rotation of the device by the mere holding stationarily of a loosely mounted adjustment cap located on the indicator housing. Further, the adjustment means automatically overrides, that is, becomes inoperative when the swivel arm reaches the limit of its movement in either direction, whereby injury to the mechanism is avoided even though the operator continues to hold the adjusting cap stationarily when the swivel arm has reached such limit.

Another object of the invention is the provision of novel motion multiplying and transmitting means located between and operatively connected to the work contacting pointer and the indicator disc. Said motion transmitting means includes a lever pivotally mounted at one end in the swivel arm, actuated by the work contacting pointer, but otherwise free. The lever has sliding engagement only near its free end with a pin on a segmental gear which is part of a train of gears which transmits motion from the segmental gear to the rack bar on which the indicator disc is mounted. The location of the pin on the segmental gear in a certain relationship to the axial center of the swivel arm assembly to be hereinafter described, together with balancing of the weight of the rack rod with the leverage weight of the segmental gear, combine to transmit accurately minute movements of the work contacting poniter to the indicator disc, in greatly multiplied degree, as will be explained more fully hereinafter.

Other advantages of the invention will appear from the drawings and the following specification.

In the drawings:

FIGS. 1 and 2 are elevational front views of a test indicator embodying my invention, showing the swivel arm assembly thereof in different positions.

FIG. 3 is a horizontal sectional view taken in the plane of the line 3—3 of FIG. 1, showing in plan view the indicator housing as it appears when the upper part of the structure including the tubular scale, assembly nut and swivel arm adjustment cap have been removed.

FIG. 4 is an elevational front view of the swivel arm assembly detached from the rest of the indicator, with the pivoted pointer omitted; and FIGS. 5 and 6 are side and top views, respectively, of the same.

Figure 10:
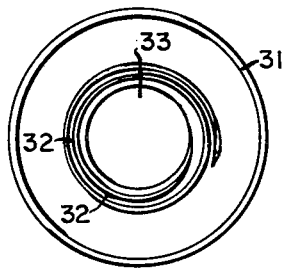
FIG. 10 is a bottom plan view of the swivel arm adjustment cap removed from the rest of the indicator.
Figure 11:
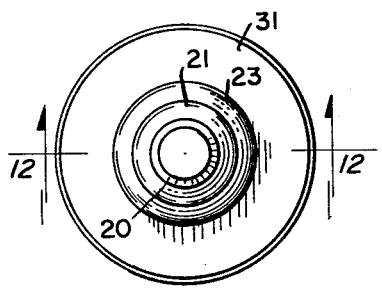
FIG. 11 is a top plan view of the indicator.
Figure 16:
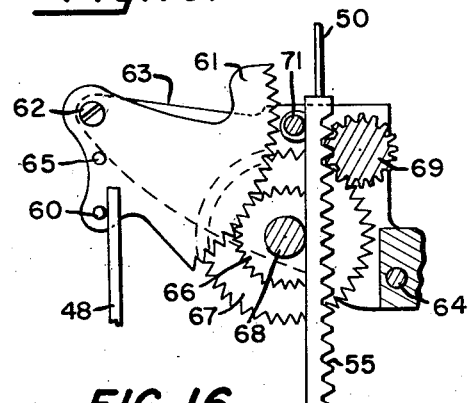
FIG. 16 is a sectional view in the plane of the line 16—16 of FIG. 15, showing the opposite side of the parts shown in FIG. 14.

Referring to the embodiment of the invention shown in the drawings, the test indicator comprises a spindle shank 20, integral with a cap 21, and a transparent tubular scale 22 mounted at its upper end in the cap 21 and at its lower end in an internally threaded assembly nut 23. The nut 23 is screwed on the externally threaded hub 24 of a plate 25 provided with an opening 26. The plate covers the top of the indicator housing 27, being fastened to a horizontal portion 28 of the housing by screws 29 (FIG. 3). An annular flange 30 rising from the plate 25 is loosely rotatably engaged by a knurled cap 31 which is the swivel arm adjustment cap shown detached in FIG. 10. The cap 31 has worm or scroll teeth 32 on its lower surface. The skirt of the cap 31 bears on the edge of the plate 25 and the threaded hub 24 of the plate 25 extends through a central circular opening 33 in the cap 31. The internally threaded nut 23 engages the top of the cap 31 when the parts are assembled as shown in FIGS. 1, 2, 12 and 13. The housing 27, plate 25, nut 23, scale 22 and spindle shank 20 are thus held in assembled relationship relatively to each other, but the knurled cap 31 is loosely mounted on the plate 25 and thus may have rotary motion relatively to the rest of the assembled parts for a purpose to be explained hereinafter.

Figure 7:
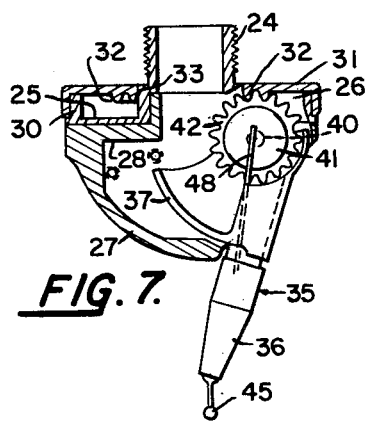
FIGS. 7 and 8 are vertical sectional views of the indicator with the upper parts and the gearing omitted, showing the swivel arm assembly in different positions.
Figure 8:
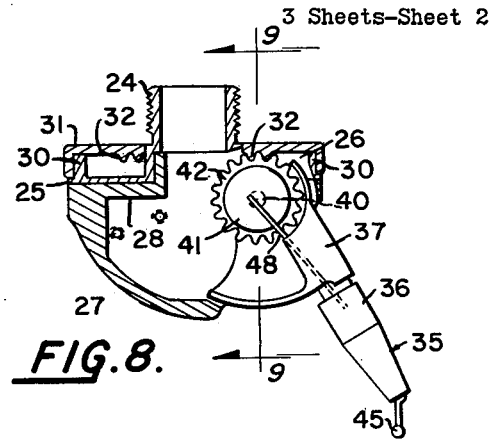
Figure 9:
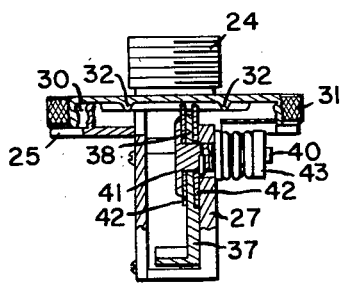
FIG. 9 is a vertical sectional view in the plane of the line 9—9 of FIG. 8.

A swivel arm assembly indicated as a whole at 35 is pivotally mounted in the housing 27 and protrudes therefrom through an opening in the housing, as shown in FIGS. 1, 2, 7 and 8. The assembly comprises an arm 36 connected at its upper end to a bracket 37 which includes a flat vertically disposed mounting plate 38 centrally apertured at 39. The assembly 35 is pivotally mounted in the housing 27 by a threaded bolt 40 which extends through the housing wall and has an enlarged flat head 41 on its inner end. A slip gear 42 is mounted at each side of the mounting plate 38, in frictional engagement with said plate 38 on bolt 40 as shown in FIG. 9. A spring nut 43 threaded onto the protruding end of the bolt 40 draws the flat head 41 toward the right of FIG. 9 and retains the mounting plate 38 and slip gears 42 in frictional but yielding engagement with each other. The swivel arm 36 and part of the bracket 37 protrude through an opening in housing 27 as shown in FIGS. 7 and 8.

The swivel arm 36 has mounted in its lower end a work contacting pointer 45 on pivot 46. The pointer 45 has connected to it two arms 47 which bear at opposite sides on a lever 48 pivotally mounted at 49 in the swivel arm 36.

The operative connections between the work contacting pointer 45 and the indicating means are shown in FIGS. 12–16, inclusive. A rack rod 50 on which is fixedly mounted a horizontally disposed indicator disc 51, visible through the tubular scale 22, is loosely mounted at its upper end 52 in a spring housing 53 containing a coiled spring 54. The lower end of the rod 50 is provided with rack teeth 55. Vertical movement of the rack bar 50 causes the disc 51 to move up or down relatively to the scale indicia 56 shown in FIGS. 12, 13.

Movement is imparted to the rack rod 50 by the following described mechanism: The work contacting pointer 45 has motion imparted to it through contact with inaccurate work surfaces, and the pointer in turn imparts corresponding motion to the pivoted lever 48. The imparted, positive motion of the lever is always to the right as viewed in FIGS. 1 and 2, regardless of the pivotal position of the pointer. The free end of the lever 48 extends upwardly through the arm 36 and bore 57 in bracket 37 of the swivel arm assembly 35 to slidingly contact a horizontally disposed pin 60 which projects rearwardly from a segmental gear 61 mounted on pivot 62 which connects the segmental gear 61 to a gear housing plate 63 (FIG. 14) fixedly mounted in the indicator housing 27 by screws 64. The pivotal motion of the segmental gear 61 is such that the pin 60 travels in an arcuate path which intersects the axial center of the bolt 40 on which the swivel arm assembly is mounted by means of the mounting plate 38. A stop 65 on segmental gear 61 limits the pivotal movement of the gear by contacting the gear housing plate 63, and in that position the pin 60 is coaxial with the bolt 40 which is the axial center of the swivel arm assembly mounting. This is the position of the parts when the pointer 45 is not imparting motion to the lever 48, but the lever is in contact with the pin 60 and ready to transmit motion instantly to the segmental gear when any pressure is exerted on the pointer 45 by contact of the pointer with the work surface. The construction is such that the indicator 51 always indicates zero regardless of adjustments made in the position of the swivel arm assembly 35, but the indicator responds instantly to any movement of the pointer 45 caused by contact of the pointer with the work surface being tested. The sliding engagement between lever 48 and pin 60 on the segmental gear 61 permits adjustment of the swivel arm assembly 35 without producing unwanted movement of the indicator and consequent false indications, it being desired that the indicator 51 respond only to movement of the pointer 45 caused by contact with the work surface being tested.

The teeth of the segmental gear 61 mesh with the teeth of a small gear 66 fixedly mounted on a larger gear 67, both rotatably mounted on the shaft 68 (FIGS. 14–16) fixed in housing 27 and gear housing plate 63. The teeth of the gear 67 engage the toothed pinion 69 rotatably mounted on shaft 70 in housing 27 and gear housing plate 63. The pinion 69 engages the teeth 55 of the rack rod 50, the straight edge of the rod 50 being guided by the roller 71. Thus the motion imparted to the pointer 45 is transmitted through arms 47 to pivoted lever 48, to segmental gear 61 by contact between lever 48 and pin 60, from gear 61 to gears 66, 67, from gear 67 to pinion 69, and to rack rod 50 on which indicator disc 51 is mounted.

Figure 12:
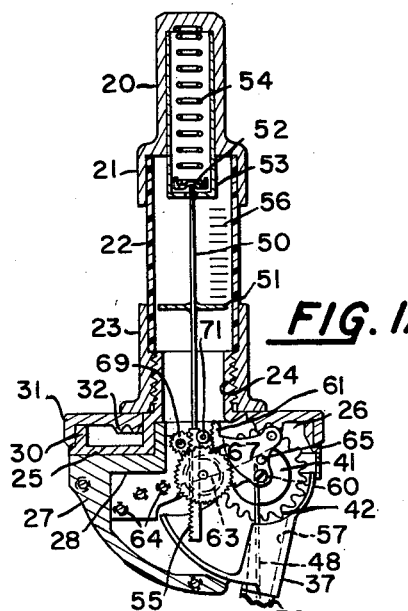
FIG. 12 is a vertical sectional view of the indicator with the swivel arm broken away, in the plane of the line 12—12 of FIG. 11.
Figure 13:
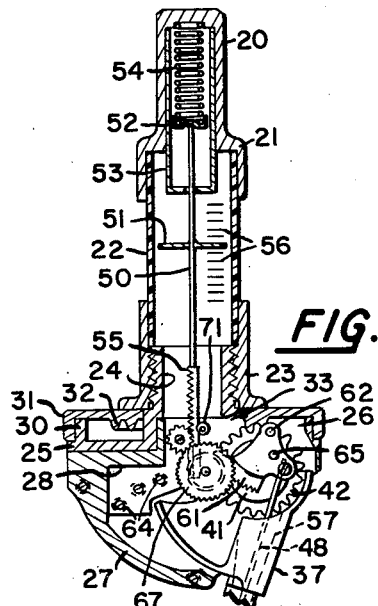
FIG. 13 is a similar view showing the rack bar and indicator disc and actuating means therefor in different positions.
Figure 14:
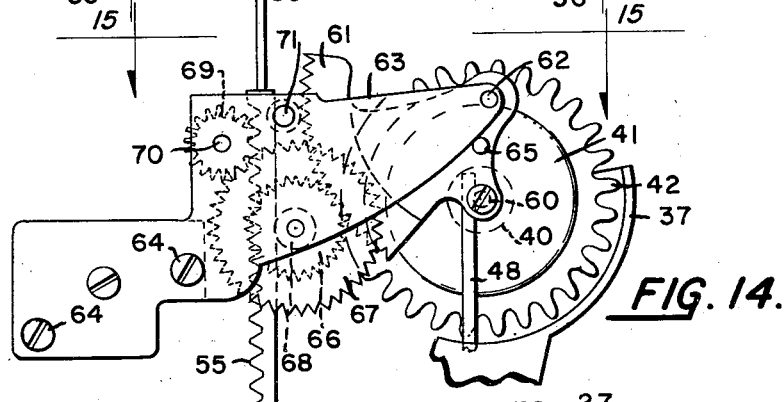
FIG. 14 is an elevational front view, enlarged, of the gear casing, and the gearing between the swivel arm lever and the indicator disc rack bar.
Figure 15:
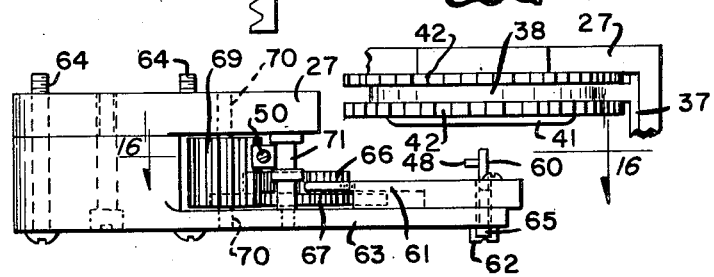
FIG. 15 is a horizontal sectional view in the plane of the line 15—15 of FIG. 14.

In FIG. 12, the indicator disc 51 is shown in zero position relatively to the indicia 56 on the scale 22, and the pivotal position of the segmental gear 61 is such that the pin 60 thereon is coaxial with the bolt 40, i.e., the axial center of the swivel arm assembly mounting. FIG. 13 shows the positions of the lever 48 and segmental gear 61 after the pointer 45 has caused the lever 48 to move to the right and through contact with pin 60 has caused the segmental gear 61, and the other gearing 66, 67, 69, to move the rack bar 50 upwardly so that the indicator disc is in a position above the zero line on scale 22, indicating that the pointer 45 has pressure exerted on it through some inaccurate work surface with which it has contact. As soon as that pressure is relieved (as by adjustment of the work), the lever 48 automatically moves to the left and returns to the position shown in FIGS. 12 and 14, where the stop 65 on the segmental gear engages the housing plate 63, and the pin 60 is again coaxial with the swivel arm assembly mounting 40. Thus the pin 60 is on center, regardless of the position of the swivel arm assembly 35, and the segmental gear 61 is ready to respond instantly to any motion of the pointer 45 transmitted through lever 48 to pin 60 on the gear 61.

The operation of the swivel arm adjustment means will be understood by reference to FIGS. 1–10, inclusive. The swivel arm assembly 35 may be moved relatively to the housing 27 to traverse a predetermined diameter, say five inches, for example, as shown in the different positions of FIGS. 1 and 2. It may be desired to align the pointer 45 with the axial center of the tool chuck in which the indicator is mounted, or the device may be used to determine inaccuracies in the edge of the work surrounding an opening ranging from a small hole to a large one of say five inches diameter. Initially the swivel arm assembly 35 is manually adjusted into desired position relatively to the work. Then the fine adjustment is made while the indicator is being rotated by the tool chuck in which it is mounted, and this is done by the operator holding the knurled adjustment cap 31 stationarily while the rest of the device is rotating. The worm or scroll teeth 32 engage the teeth of the slip gears 42 which are accessible through the opening 26 in plate 25, thus causing the slip gears 42 to rotate on bolt 40 and to frictionally rotate the mounting plate 38, which is part of the swivel arm bracket 37, about the pivotal mounting 40. Thus the swivel arm is moved to desired position to place the pointer 45 into contact with the work to be tested.

If the operator holds the adjustment cap 31 stationarily when the swivel arm assembly has reached the limit of its movement in either direction, the adjustment means overrides and movement of the arm is stopped automatically without damage to the parts due to the slip mounting of the gears 42 relatively to the bolt 40.

In the embodiment shown, the segmental gear 61 is a segment of a 90 toothed gear, the small gear 66 has 24 teeth, the larger gear 67 has 40 teeth and the pinion 69 has 16 teeth. This gear ratio greatly multiplies the motion transmitted by the work contacting pointer 45 to indicator disc 51 on rack rod 50.

The weight of the rack bar 50 and the leverage weight of the segmental gear are balanced so that the segmental gear transmits minute motions, in amplified degree, to the rack bar and indicator disc thereon, which accurately reflect the minute movements of the pointer 45.

Changes may be made in details of construction and form of the parts without departing from the scope of the invention defined by the appended claims.

I claim:

1. A test indicator comprising a spindle shank adapted to be mounted in a rotated tool chuck, a housing connected to the shank, a scale between the housing and spindle, an indicator movable relatively to the scale, a swivel arm assembly in the housing having an arm protruding from the housing, means pivotally connecting the assembly to the housing, a work contacting pointer pivotally mounted in the arm, means operatively connecting the pointer and indicator, and means automatically adjusting the position of the swivel arm assembly relatively to the housing while the test indicator is being rotated by the tool chuck in which the shank is mounted, said adjusting means comprising an adjustment cap loosely mounted on the housing for relative rotative movement and adapted to be grasped manually and held stationarily while the rest of the test indicator is being rotated, means on the adjustment cap and means on the swivel arm assembly engaging each other whereby rotation of the housing relatively to the adjustment cap while the latter is held stationarily automatically moves the swivel arm assembly about its pivotal connection to the housing.

2. The test indicator defined by claim 1 in which the means pivotally connecting the swivel arm assembly to the housing includes a mounting bolt and slip gears thereon whereby pivotal movement of the swivel arm automatically ceases when the swivel arm assembly reaches the limit of its movement in either direction.

3. A test indicator comprising a spindle shank, a housing, a scale between the housing and spindle, an indicator movable relatively to the scale, a swivel arm assembly in the housing having an arm protruding from an opening in the housing, means pivotally connecting the assembly to the housing, a work contacting pointer pivotally mounted in the arm, means operatively connecting the pointer and indicator, and means adjusting the position of the swivel arm assembly relatively to the housing, said adjusting means comprising an adjustment cap loosely mounted on the housing, worm teeth on the cap, and a toothed gear rotatably mounted in the housing in mesh with the worm teeth on the cap, the toothed gear having frictional engagement with a part of the swivel arm assembly, whereby rotation of the housing relatively to the adjustment cap causes the worm teeth on the cap to rotate the toothed gear and to frictionally move the swivel arm assembly about its pivotal connection to the housing.

4. A test indicator comprising a spindle shank, a housing, a scale between the housing and spindle, an indicator movable relatively to the scale, a swivel arm assembly in the housing including a flat vertically disposed mounting plate, a bracket connected to the plate and an arm depending from the bracket protruding from an opening in the housing, means pivotally connecting the mounting plate to the housing, a work contacting pointer pivotally mounted in the arm, means operatively connecting the pointer and indicator, and means adjusting the position of the swivel arm assembly relatively to the housing, said adjusting means comprising an adjustment cap loosely mounted on the housing, worm teeth on the cap, a pair of slip gears rotatably mounted in the housing in frictional contact with opposite sides of the mounting plate and in mesh with the worm teeth on the cap, whereby rotation of the housing relatively to the adjustment cap causes the worm teeth on the cap to rotate the slip gears and to frictionally move the swivel arm assembly about its pivotal connection to the housing.

5. A test indicator comprising a spindle shank, a cap integral with the shank, a tubular scale having its upper end mounted in the cap, an internally threaded assembly nut, the lower end of the scale being mounted in the nut, an indicator disc movable in the scale, a housing, an apertured upper plate covering the housing, an externally threaded hub rising from the plate engaged by said assembly nut, a swivel arm assembly in the housing having and arm protruding from an opening in the housing, means pivotally connecting the swivel arm assembly to the housing, a work contacting pointer pivotally mounted in the arm, means operatively connecting the pointer and indicator disc, and means adjusting the position of the swivel arm assembly relatively to the housing, said adjusting means comprising an adjustment cap loosely mounted on the housing between said upper plate and assembly nut, means on the adjustment cap and means on the swivel arm assembly engaging each other through said apertured upper plate, whereby rotation of the housing relatively to the adjustment cap moves the swivel arm assembly about its pivotal connection to the housing.

6. A test indicator comprising a spindle shank, a housing, a scale between the housing and spindle, an indicator movable relatively to the scale, a swivel arm assembly in the housing having an arm protruding from an opening in the housing, means pivotally connecting the assembly to the housing, a work contacting pointer pivotally mounted in the arm, and means operatively connecting the pointer and indicator, said means comprising a lever extending through the arm and into the housing, means pivotally connecting the lower end of the lever to the arm, the upper end of the lever being free, means actuated by the pointer bearing on the lever and transmitting pointer movement to the lever, a segmental gear in the housing, means pivotally connecting the segmental gear to the housing, means on the segmental gear slidingly engaged by the lever and transmitting motion of the lever to the gear, a stop limiting the movement of the segmental gear in one direction, a rack bar movable in the scale having an upper part connected to the indicator and a lower toothed portion extending into the housing, and gearing between the segmental gear and the toothed portion of the rack bar transmitting movement of the segmental gear to the rack bar and indicator, said means pivotally connecting the swivel arm assembly to the housing being a threaded bolt mounted in the housing, and the means on the segmental gear slidingly engaged by the lever is a pin projecting horizontally from the gear, said bolt and pin being coaxial when the indicator is in zero position and the segmental gear has been stopped by the stop on the gear, and said pin being movable with the segmental gear in a path which intersects the axial center of said bolt when the segmental gear is actuated by movement of the lever.

7. A test indicator comprising a spindle shank, a cap integral with the shank, a transparent tubular scale having its upper end mounted in the cap, a threaded assembly nut, an indicator disc in the scale, a housing, an apertured upper plate covering the housing, a threaded hub rising from the plate engaged by said assembly nut, a swivel arm assembly in the housing having an arm protruding from an opening in the housing, means pivotally connecting the swivel arm assembly to the housing, a work contacting pointer pivotally mounted in the arm, means adjusting the position of the swivel arm assembly relatively to the housing, said adjustment means comprising an adjustment cap loosely mounted on the housing between said upper plate and assembly nut, means on the adjustment cap and means on the swivel arm assembly engaging each other through said apertured upper plate whereby rotation of the housing relatively to the adjustment cap moves the swivel arm assembly about its pivotal connection to the housing, and means operatively connecting the pointer and indicator disc, said means comprising a lever extending through the arm and into the housing, means pivotally connecting the lower end of the lever to the arm, means actuated by the pointer bearing on the lever and transmitting pointer movement to the lever, a segmental gear in the housing, means pivotally connecting the segmental gear to the housing, means on the segmental gear slidingly engaged by the lever and transmitting motion of the lever to the gear, a stop limiting the movement of the segmental gear in one direction, a rack bar movable in the scale having an upper part connected to the indicator disc and a lower toothed portion extending into the housing, and gearing between the segmental gear and the toothed portion of the rack bar transmitting movement of the segmental gear to the rack bar and indicator disc.

8. The test indicator defined by claim 7, in which the means pivotally connecting the swivel arm assembly to the housing is a horizontally disposed threaded bolt mounted in the housing, and the means on the segmental gear slidingly engaged by the lever is a pin projecting horizontally from the gear, said bolt and pin being coaxial when the indicator disc is in zero position and the segmental gear has been stopped by the stop on the gear, and said pin being movable with the segmental gear in a path which intersects the axial center of said bolt when the segmental gear is actuated by movement of the lever.

References Cited in the file of this patent
UNITED STATES PATENTS

| | | |
|---|---|---|
| 1,269,728 | Miller | June 18, 1918 |
| 2,076,819 | Jones | Apr. 13, 1937 |